(12) United States Patent
 Chen

(10) Patent No.: US 8,840,504 B2
(45) Date of Patent: Sep. 23, 2014

(54) CONTINUOUSLY VARIABLE TRANSMISSION FOR A HYDRAULIC MECHANISM IN HYBRID CARS WITH RECOVERED POWER-SPLIT ENERGY

(75) Inventor: Bin Chen, Ningbo (CN)

(73) Assignee: Ningbo Surely Meh Co., Ltd., Ningbo (CN)

( * ) Notice: Subject to any disclaimer, the term of this patent is extended or adjusted under 35 U.S.C. 154(b) by 343 days.

(21) Appl. No.: 13/152,177

(22) Filed: Jun. 2, 2011

(65) Prior Publication Data

US 2011/0300984 A1  Dec. 8, 2011

(30) Foreign Application Priority Data

Jun. 2, 2010 (CN) .......................... 2010 1 0198109

(51) Int. Cl.
 *F16H 47/04* (2006.01)
(52) U.S. Cl.
 USPC ........................................................... 475/83
(58) Field of Classification Search
 USPC ....................................... 475/78–83; 903/911
 See application file for complete search history.

(56) References Cited

U.S. PATENT DOCUMENTS

| | | | |
|---|---|---|---|
| 7,744,499 B2 * | 6/2010 | Stecklein ........................ | 475/72 |
| 8,043,183 B2 * | 10/2011 | Mueller et al. .................. | 475/83 |
| 8,454,469 B2 * | 6/2013 | Ivantysynova et al. ......... | 475/83 |
| 2009/0036248 A1 * | 2/2009 | Mueller et al. .................. | 475/72 |

* cited by examiner

*Primary Examiner* — Jacob S Scott
(74) *Attorney, Agent, or Firm* — Pearne & Gordon LLP

(57) ABSTRACT

A continuously variable transmission for a hydraulic mechanism in hybrid cars with recovered power-split energy mainly comprises a multi-function planet differential gear train pump and a hydraulic variable pump (motor). The planet differential gear train pump provides a hydraulic constant pump, and a planet gear system thereof provides a speed-adjustable function as well as a speed-collecting function. Thereby, the planet differential gear train pump of the present invention is used to substitute the conventional planet gear system and the hydraulic constant pump in the continuously variable transmission.

2 Claims, 6 Drawing Sheets

CONTINUOUSLY VARIABLE TRANSMISSION FOR A HYDRAULIC MECHANISM IN HYBRID CARS WITH RECOVERED POWER-SPLIT ENERGY

CROSS-REFERENCE(S) TO RELATED APPLICATION(S)

This application claims the benefit of Chinese Application 201010198109.2, filed Jun. 2, 2010, which is hereby incorporated by reference, in its entirety.

BACKGROUND

1. Field

The present invention relates to a continuously variable transmission for a hydraulic mechanism in hybrid cars with recovered power-split energy. A multi-function planet differential gear train pump is mainly adopted for further connecting to a friction brake, a hydraulic accumulator, a pressure sensor, a flow sensor, and a hydraulic valve controlling circuit so as to establish afore continuously variable transmission. Obviously, a hydraulic machinery composite transmission is provided along with a safe buffer and a buffer coupling as well as functions like recycling braking energy, storing hydraulic energy, recovering power, and operating in the continuously variable transmission. The present invention allows a car to reduce 20%~40% driving power and to recycle more than 80% braking energy. If the traditional braking system malfunctions, the car could be still cushioned and braked by retrieving inertia kinetic energy. Thereby, the inertia kinetic energy is stored in the accumulator in a means of the potential energy of hydraulic static pressure. Preferably, the stored energy is provided for starting and accelerating the car. The present invention is especially suited to cars or buses that are often halted in the city.

2. Description of Related Art

The published continuously variable transmission with power-split energy is mainly composed by a hydraulic constant pump (motor), a hydraulic variable pump (motor), and a planet gear system. Such transmission is however bulky, the performance thereof is weak, and the structure of the same is adversely heavy. Moreover, noise is easily generated in afore transmission and this transmission merely provides a basic function. Even worse, the installation of the conventional transmission is difficult, so it is hard to be popular. For example, the hydraulic constant pump (motor), the hydraulic variable pump (motor), and the planet gear system provided by the Sundstrand Company in the U.S.A. further cooperate with two sets of friction clutches and four pairs of gear sets. Herein, the cooperation contributes to a continuously variable transmission for power-split hydraulic mechanism with parallel shafts DMT25. However, this transmission is also bulky and heavy, the function thereof is simple, and the installation thereof is still complicated. As a result, the company does not produce the same transmission anymore.

BRIEF SUMMARY

The present invention is to solve shortcomings existing in the conventional hydraulic mechanism with the power-split system such as the bulky dimension, the weak performance, the heavy structure, the simple function, the annoying noise, and the difficult installation. Accordingly, the present invention adopts a planet differential gear train pump and a hydraulic variable pump of through shaft to connect with a friction brake, hydraulic accumulators, a pressure sensor, a flow sensor, and a hydraulic valve controlling circuit so as to establish the desired continuously variable transmission for the hydraulic mechanism with recovered power-split energy.

Solving the conventional disadvantages, the applicant utilizes a published and patented product "A MULTI-FUNCTION DRIVING UNIT FOR HYBRID CARS", under the Chinese patent no. ZL. 2009201680 53.9. Herein, the planet differential gear train pump in the present invention provides properties that used to be contained in the conventional hydraulic constant pump (motor) and the planet gear system so as to offer a speed-adjustable function as well as a speed-collecting function. Thus, the conventional planet gear system and the hydraulic constant pump (motor) in the hydraulic mechanism with the power-split system of the continuously variable transmission are replaced. Wherein, the hydraulic variable pump (motor) of through shaft is substituted for the conventional hydraulic variable pump (motor). The hydraulic variable pump (motor) of through shaft further coaxially connects to a power input shaft or a power output shaft of the planet differential gear train pump, so that a speed-adjustable unit or a speed-collecting unit for a hydraulic mechanism with a power-split energy recovery system is provided within a single axis. This invention is not only able to provide a continuously variable transmission but also transform inertia kinetic energy of the car into hydraulic potential energy in the high pressure reservoir while the speed of the car is reduced and the car is to be stopped. When the car is started and accelerated, the hydraulic potential energy stored in the high pressure reservoir is transformed into mechanical energy via the planet differential gear train pump and the hydraulic variable pump of through shaft in a motoring status so as to propel the car. When the car is in an economical cruising, the continuously variable transmission automatically adjusts the rotative speed of the motor according to different speeds per hour, thereby deciding an optimum working zone.

The present invention improves the transmission system in the cars. Namely, the power intensity of the transmission would be enhanced, and the rates of energy exchange, storage, and recovery would all be promoted. Further, the consumption of fuel would be economized by reducing the discharging amount of the motor but concurrently enhancing the working efficiency thereof. Moreover, the correlated recycling, storage, and recovery on the braking energy would all reach the maximum amount; the total efficiency of the recycling rate and the recovery rate would reach 70%, which is as many as four times provided by the conventional hybrid cars. If the conventional braking system malfunctions, the recycled braking energy is provided for stopping the car with a cushioning effect. At the same time, the inertia kinetic energy is recycled for being stored in the hydraulic accumulator in the form of static energy of hydraulic fluid. Thereby, the provided energy is sufficient for starting and accelerating the car. While the present invention is applied to the car that is mostly driven in the city, the consumed energy and carbon would be largely decreased. While the present invention is applied to the city bus, the bus economizes on fuel by 30%. That is, each bus economizes on fuel by more than 10 tons every year, the cost on the fuel of each bus is accordingly decreased by 70 thousand dollars, and the discharge of carbon dioxide is diminished by more than 20 tons. Apparently, the present invention benefits the economy and the society.

DETAILED DESCRIPTION

The following description sets forth exemplary methods, parameters and the like. It should be recognized, however, that such description is not intended as a limitation on the scope of the present disclosure but is instead provided as a description of exemplary embodiments.

Figure 1A:
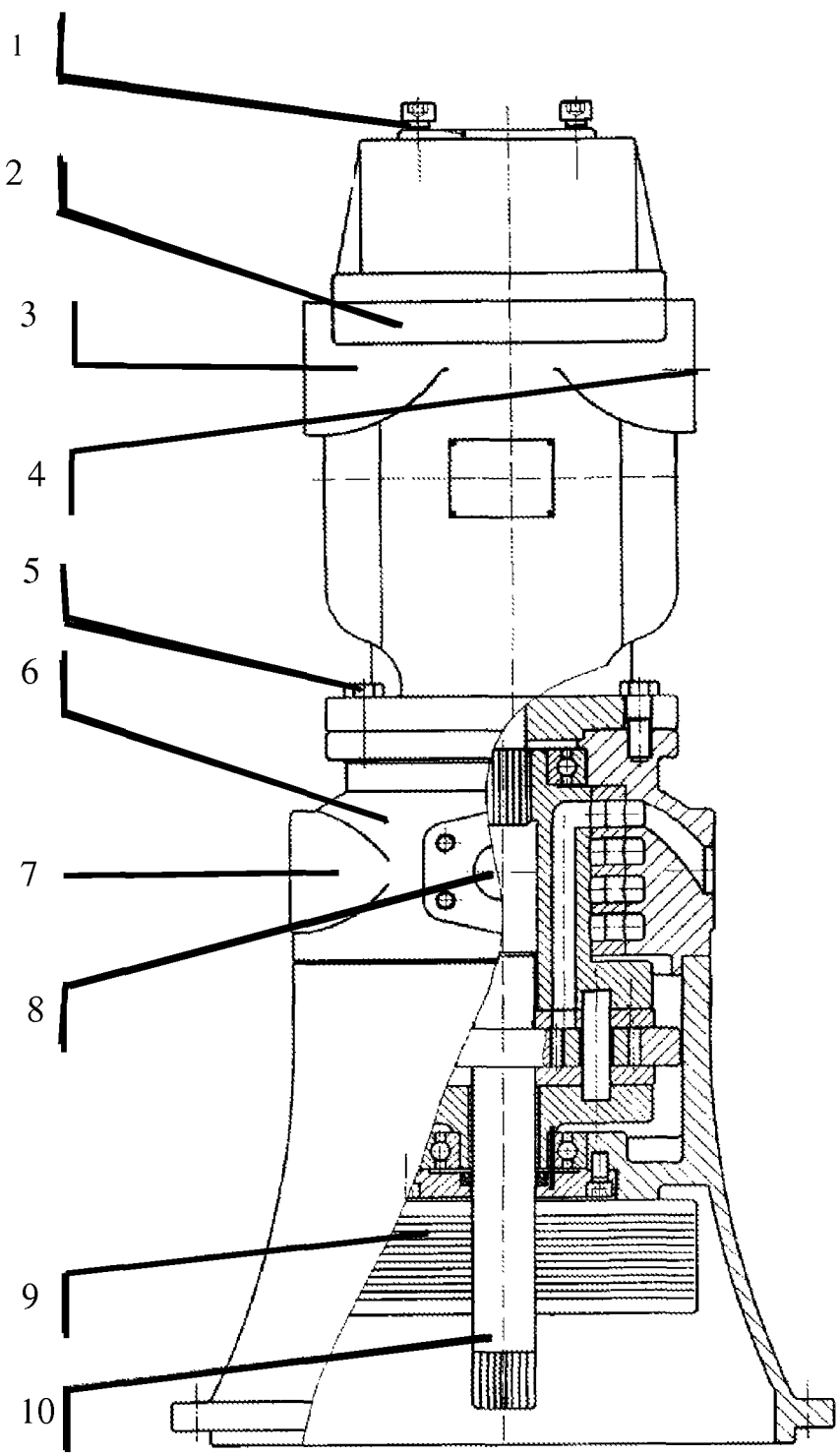
FIG. 1A is a cross-sectional view showing the present invention in a speed-adjustable unit; in the figure, a power output shaft 1, a hydraulic variable pump (motor) 2, an entrance 3 for hydraulic variable pump (motor), an exit 4 for hydraulic variable pump, a bolt 5, a planet differential gear train pump 6, an inlet 7 of the planet differential gear train pump, an outlet 8 of the planet differential gear train pump, a friction brake 9, and a power input shaft 10 are shown.
Figure 1B:
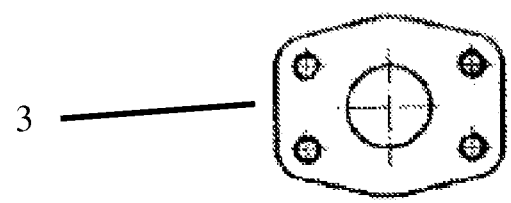
FIG. 1B is a partial top view of the entrance 3.
Figure 1C:
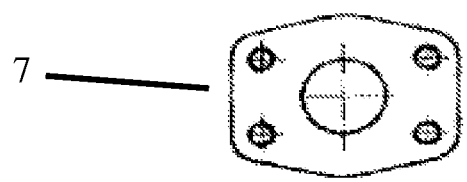
FIG. 1C is a partial top view of the inlet 7.
Figure 2:
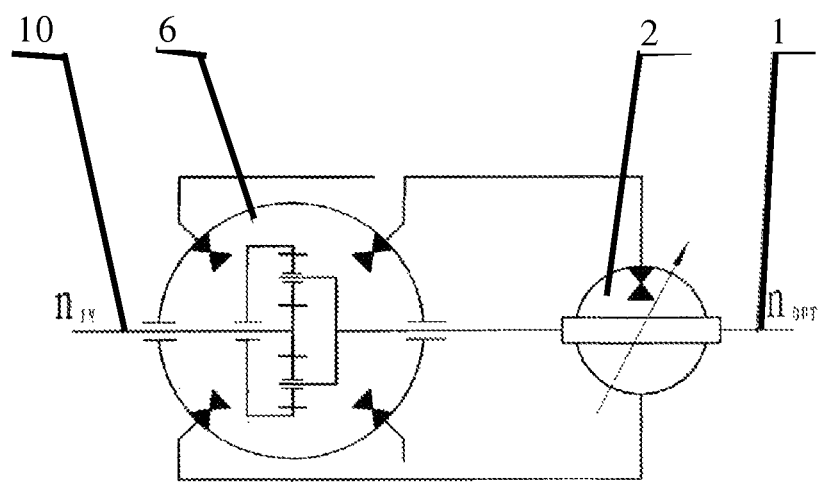
FIG. 2 is a schematic view showing the present invention in the speed-adjustable unit in operation.

Referring to FIG. 1, an output shaft of a planet differential gear train pump (6) coaxially couples with a power output shaft (1) of a hydraulic pump (2) of through shaft. A bolt (5) is adopted for fastening said two shafts; thereby, these two shafts contribute to a speed-adjustable unit for a hydraulic mechanism with a power-split system. Herein, the hydraulic variable pump (motor) (2), a power input shaft, and the power output shaft (1) are coaxially disposed. The power input shaft (10) adopts any one of a sun gear, a planet carrier, or a ring gear mainly included in the planet differential gear train pump (6). Any one of the other two elements of said gears and carrier is coaxially coupled to the power output shaft (1) and the variable hydraulic pump (motor) (2). Wherein, the referred coupling includes six variations in turn. The sun gear, the planet carrier, and the ring gear of the planet differential gear train pump (6) are not fixed to a pump housing, so an output torque of the planet differential gear train pump (6) equals an input torque thereof. The planet differential gear train pump (6) allows a mechanical torque of the power input shaft (10) to be transmitted to the power output shaft (1) and allows partial mechanical energy to be transformed into static energy of hydraulic fluid. Afterward, the static energy of hydraulic fluid is thence conveyed to the hydraulic variable pump (motor) (2) and transformed by the same so as to achieve a rotative mechanical torque and an input torque for further adding to the power output shaft (1). Herein, the rotative speeds of the power output shaft (1) and the power input shaft (10) determine an output amount of the hydraulic pressure of the planet differential gear train pump (6). Namely, the larger the rotative speed difference, the more the output amount. Also, when the discharge amount of the hydraulic variable pump (2) is increased, the output torque is accordingly augmented. When the output amount of the hydraulic pressure of the planet differential gear train pump (6) is augmented, the rotative speed of the power output shaft (1) is lessened.

Figure 3A:
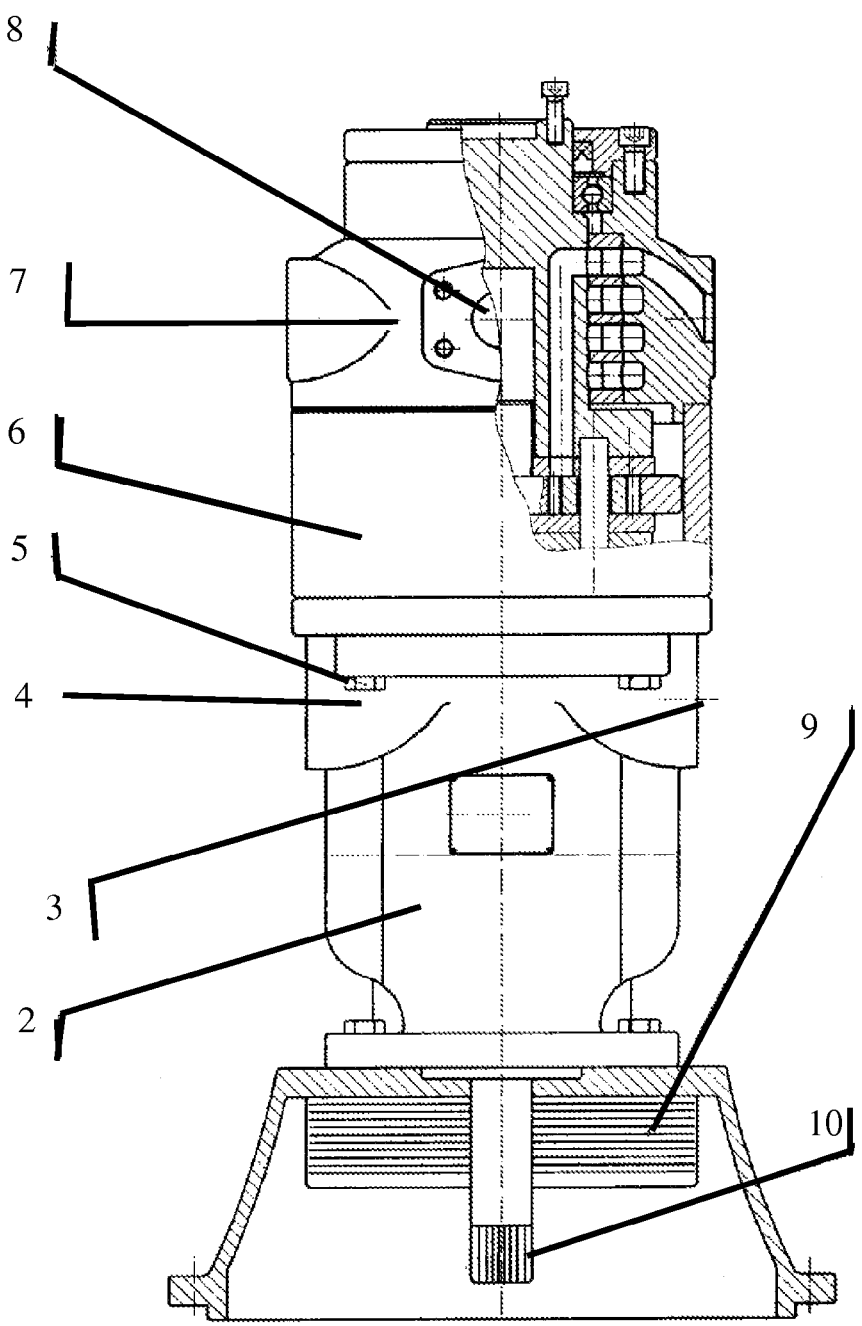
FIG. 3A is cross-sectional view showing the present invention in a speed-collecting Unit.
Figure 3B:
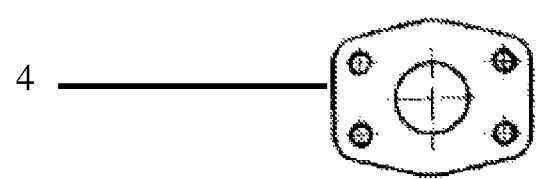
FIG. 3B is a partial top view of the exit 4.
Figure 3C:
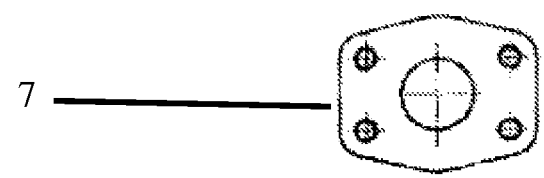
FIG. 3C is a partial top view of the inlet 7.

Referring to FIG. 3, the input shaft of the planet differential gear train pump (6) and the power output shaft of the hydraulic variable pump (2) are coaxially disposed. Wherein, afore two shafts are fastened via the bolt (5). Accordingly, the shafts further contribute to a speed-collecting unit for the hydraulic mechanism with a power-split energy recovery system.

Figure 4:
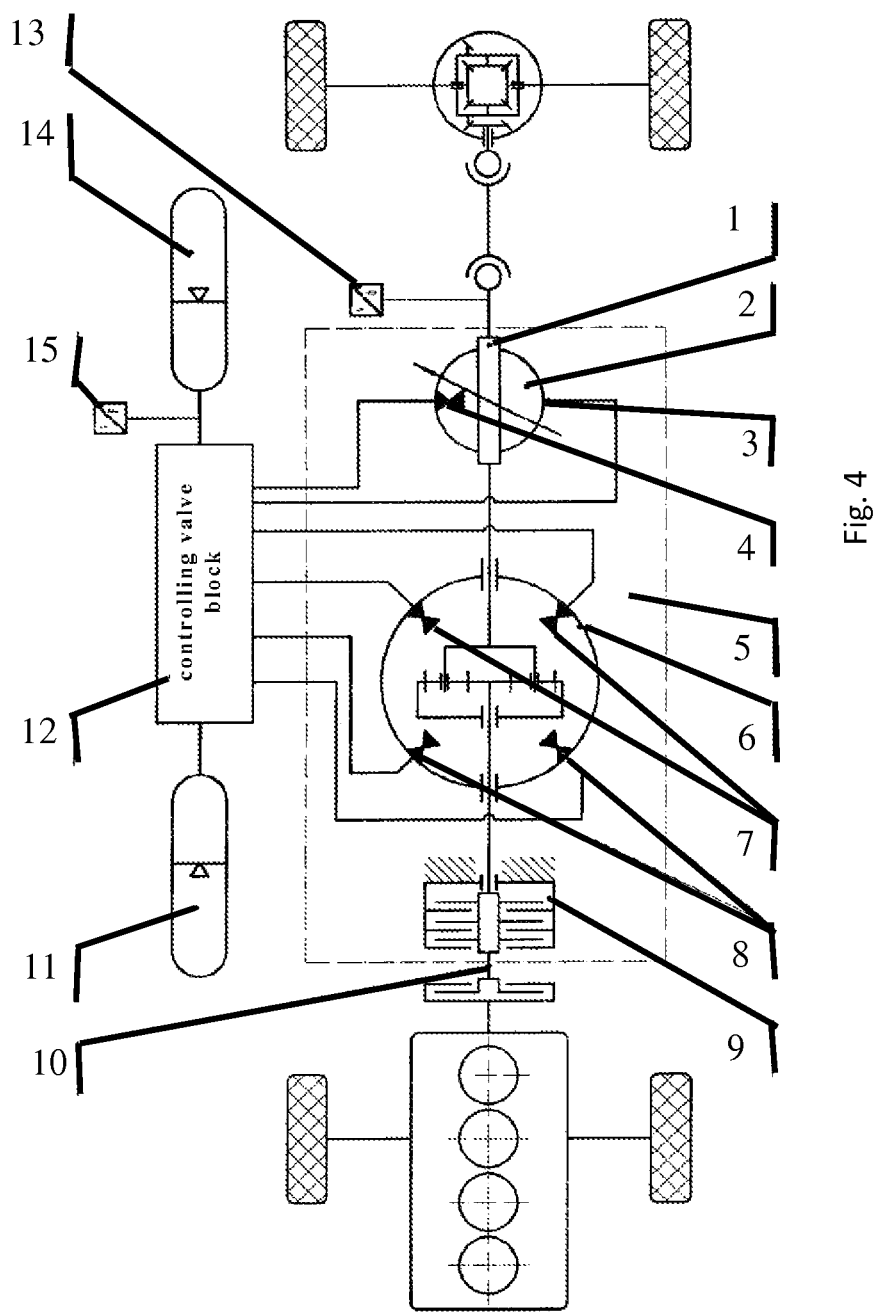
FIG. 4 is a schematic view showing the present invention in the speed-adjustable unit in operation; in the figure, a low pressure reservoir 11, a hydraulic controlling valve block 12, a speed sensor 13, a high pressure reservoir 14, and a pressure sensor 15 are shown.

Referring to FIG. 4, the speed-adjustable unit for the hydraulic mechanism with the power-split system comprises a friction brake (9), whose stationary part is fixed to the pump housing and whose moving part is fixed to the power input shaft (10). The entrance (3), the exit (4), two inlets (7) of the planet differential gear train pump, two outlets (8) of the planet differential gear train pump, a low pressure reservoir (11), and a high pressure reservoir (14) are all attached to a hydraulic controlling valve block (12). A pressure sensor (15) is connected to a first passage and a second passage of the high pressure reservoir (14) for detecting the pressure thereon. A speed sensor (13) is connected to the power output shaft (1) for detecting the rotative speed thereon. When the speed of the car or the like transportation is to be reduced, the friction brake (9) is provided for compactly stopping. Hereby, the low pressure reservoir (11) connects to the inlets of the planet differential gear train pump (6) and the variable hydraulic pump (motor) (2) via the hydraulic controlling valve block (12). At the same time, the high pressure reservoir (14) connects to the outlets of the planet differential gear train pump (6) and the variable hydraulic pump (motor) (2) via the hydraulic controlling valve block (12). Accordingly, the planet differential gear train pump (6) and the variable hydraulic pump of through shaft (2) are operated in a pumping status since hydraulic oil in the low pressure reservoir (11) is pumped into the high pressure reservoir (14), and loaded inertia kinetic energy is recovered and transformed into potential energy of the hydraulic pressure for storing. Correspondingly, while starting the car, the friction brake (9) is provided for compactly stopping the car. Herein, the high pressure reservoir (14) connects to the inlet of the planet differential gear train pump (6) and the entrance of the variable hydraulic pump (motor) (2) via the hydraulic controlling valve block (12). Accordingly, the planet differential gear train pump (6) and the variable hydraulic pump (2) are operated in a motoring status. Namely, the high pressure reservoir (14) releasing the hydraulic energy, the hydraulic energy is thus transformed into the mechanical torque and accordingly output via the planet differential gear train pump (6) and the variable hydraulic pump (motor) (2). Thereby, the car is propelled via the low pressure reservoir (11) connecting to the outlet of the planet differential gear train pump (6) and the exit of the variable hydraulic pump (motor) (2) through the hydraulic controlling valve block (12), which concurrently stores the hydraulic oil.

What is claimed is:

1. A continuously variable transmission for a hydraulic mechanism in hybrid cars with recovered power-split energy comprising:

a power input shaft (10) that couples any one of a sun gear, a planet carrier, or a ring gear mainly included in a planet differential gear train pump (6); the planet carrier or the ring gear being coupled to a power output shaft (1) of a hydraulic variable pump (motor) (2); wherein, said power output shaft (1) of said hydraulic variable pump (motor) (2) and said power input shaft being disposed coaxially; said sun gear, said planet carrier, and said ring gear being not fixed to a pump housing; said planet differential gear train pump (6) allowing a mechanical torque of said power input shaft (10) to be transmitted to said power output shaft (1) and allowing partial mechanical energy to be transformed into static energy of hydraulic fluid; a hydraulic controlling valve block (12) conveying said static energy of hydraulic fluid to said hydraulic variable pump (2); said hydraulic variable pump (2) transforming said static energy of hydraulic fluid into a rotative mechanical torque so as to add said mechanical torque and said input torque to said power output shaft (1); a stationary part of a friction brake (9) being fixed to said pump housing; and a moving part of said friction brake being fixed to said power input shaft (10); an entrance (3) for the hydraulic variable pump, an exit (4) for the hydraulic variable pump, two inlets (7) of said planet differential gear train pump, two outlets (8) of said planet differential gear train pump, a low pressure reservoir (11), and a high pressure reservoir (14) being all attached to said hydraulic controlling valve block (12); a pressure sensor (15) being attached to a first passage and a second passage of said high pressure reservoir (14) for sensing a pressure on said high pressure reservoir (14); a speed sensor (13) being connected to said power output shaft (1) for sensing a rotative speed of said power output shaft (1); wherein, by an input end of said planet differential gear train pump (6) being coaxially connected to said power output shaft of said hydraulic variable pump (2), a speed-collecting unit for the hydraulic mechanism with a power-split system is provided.

2. The continuously variable transmission as claimed in claim 1, wherein, when speed of said cars is to be reduced, said friction brake (9) is provided for compactly stopping said cars; said low pressure reservoir (11) connects to said inlets of said planet differential gear train pump (6) and said hydraulic variable pump (motor) (2) via said hydraulic controlling valve block (12); said high pressure reservoir (14) connects to said outlets of said planet differential gear train pump (6) and said hydraulic variable pump (motor) (2) via said hydraulic controlling valve block (12); said planet differential gear train pump (6) and said hydraulic variable pump (2) are operated in a pumping status; hydraulic oil in said low pressure reservoir (11) is pumped into said high pressure reservoir (14), and loaded inertia kinetic energy is recovered and transformed into potential energy of hydraulic pressure for storing; while starting said car, said friction brake (9) is provided for compactly stopping said cars; said high pressure reservoir (14) connects to said inlet of said planet differential gear train pump (6) and said entrance of said hydraulic variable pump (motor) (2) via said hydraulic controlling valve block (12); said planet differential gear train pump (6) and said hydraulic variable pump (2) are operated in a motoring status; said high pressure reservoir (14) releases said hydraulic energy; said hydraulic energy is transformed into said mechanical torque and accordingly output via said planet differential gear train pump (6) and said hydraulic variable pump (2); said low pressure reservoir (11) connects to said outlet of said planet differential gear train pump (6) and said exit of said hydraulic variable pump (motor) (2) via said hydraulic controlling valve block (12) so as to store said hydraulic oil.

\* \* \* \* \*